(12) United States Patent
Miyamoto et al.

(10) Patent No.: US 6,407,471 B1
(45) Date of Patent: Jun. 18, 2002

(54) LINEAR MOTOR

(75) Inventors: Yasuhiro Miyamoto; Masaki Hisatsune; Kazuhiro Maekawa; Takato Doi; Masahiko Tanabe, all of Kitakyushu (JP)

(73) Assignee: Kabushiki Kaisha Yaskawa Denki, Kitakyushu (JP)

( * ) Notice: Subject to any disclaimer, the term of this patent is extended or adjusted under 35 U.S.C. 154(b) by 37 days.

(21) Appl. No.: 09/597,552

(22) Filed: Jun. 19, 2000

(51) Int. Cl.$^7$ .......................... H02K 41/00; H02K 15/00
(52) U.S. Cl. ............................................. 310/12; 29/596
(58) Field of Search .............................. 310/12, 13, 14, 310/42; 29/596

(56) References Cited

U.S. PATENT DOCUMENTS 5,757,091 A * 5/1998 Sogabe et al. ................ 310/12
6,018,207 A * 1/2000 Saban et al. ................ 310/217

\* cited by examiner

Primary Examiner—Nestor Ramirez
Assistant Examiner—Judson H. Jones
(74) Attorney, Agent, or Firm—Armstrong, Westerman & Hattori, LLP.

(57) ABSTRACT

The invention relates to a linear motor which is provided with a row of permanent magnets 6a, 6b, 6c, . . . for a field system, and an armature 2 facing the same via a magnetized space in an orthogonal direction thereto, wherein the armature core 3 has a winding accommodation groove 3a formed at both sides of armature iron plates produced by punching out oriented electromagnetic steel plate so as to become rectangular, and convex and concave engagement portions 3b and 3c, the armature iron plates are laminated to constitute one core block, and at the same time, the lengthwise direction, orthogonal to the permanent magnet row, in the respective core blocks is made the same as the rolling direction of electromagnetic steel plates. Thereby, since the magnetic flux of the armature winding 4 flows along the rolling direction of the core blocks, the magnetic flux density can be increased, and the peak thrust can be also increased.

6 Claims, 6 Drawing Sheets

LINEAR MOTOR

BACKGROUND OF THE INVENTION

1. Field of the Invention

The present invention relates to a linear motor which is capable of increasing peak thrust and simultaneously counterbalancing a cogging thrust produced due to an edge effect of an armature, and in which the length of the linear motor in the axial direction can be adequately constructed.

2. Description of the Related Arts

Figure 9:
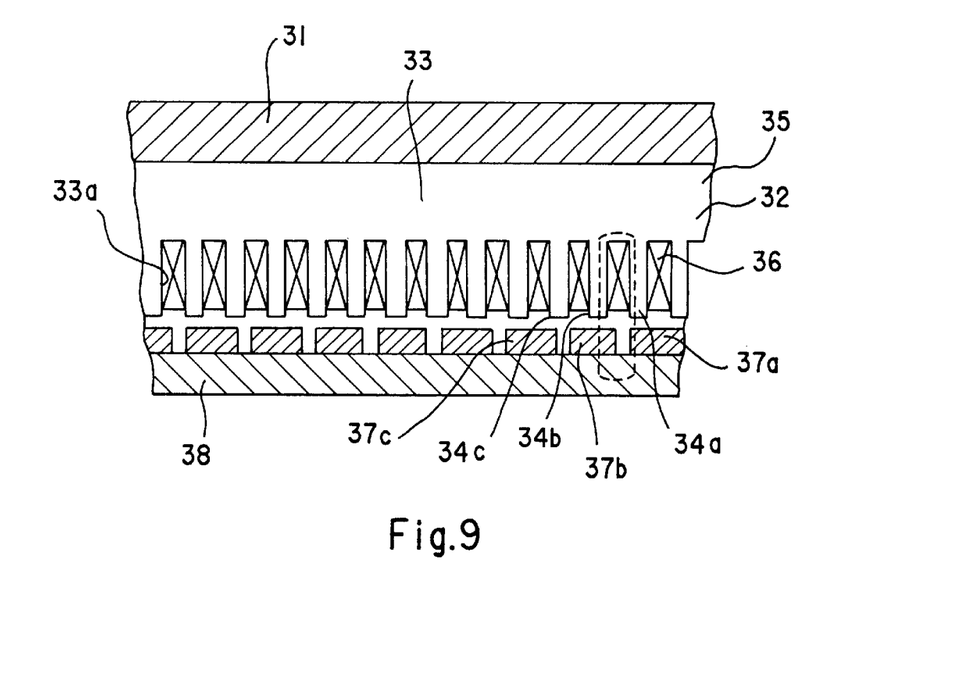
FIG. 9 is a side sectional view of a prior art linear motor.

A prior art linear motor is constructed as shown in FIG. 9. In the drawing, the linear motor is composed of a rotor 31, an armature 32 attached to the rotor 31, a fixed portion 38 facing the armature 32 via spacing, permanent magnets 37a, 37b, 37c, ... attached to the fixed portion 38. The armature 32 is such that an armature winding 36 is accommodated in a winding accommodation groove of an armature core 33 in which an armature iron plate having teeth 34a, 34b, 34c, ... produced by punching out electromagnetic steel plate like comb teeth and forming a winding accommodation groove 33a, and a yoke 35 for connection of the teeth 34a, 34b, 34c, ... are laminated and fixed, and it is attached to the rear side of the rotor 31. The permanent magnets 37a, 37b, 37c, ... are attached to and constructed at a fixing portion 38 so that they face the armature core 33 and they are positioned so as to have different polarities to each other.

In such a construction, if electric current is caused to flow in the armature winding 36 of the linear motor 30, the rotor is caused to move in the axial direction by an electromagnetic action between the armature winding 36 and permanent magnets 37a, 37b, 37c, ....

However, there are the following problems in a prior art problems.

(1) Since the teeth 34a, 34b, 34c, ... to form a winding accommodation groove and a yoke 35 to connect the teeth 34a, 34b, 34c, ... were integrally punched out like comb teeth to compose an armature core, the length of the armature core in the axial direction as a block becomes longer, wherein it was not possible to adequately set the length of the linear motor in the axial direction.

(2) Since the teeth 34a, 34b, 34c, ... and yoke 35 are integrally punched out, a magnetic flux from the armature winding is, as shown by dotted lines in FIG. 9, spread from the teeth 34a of the armature core 33 to the permanent magnet 37a, and a magnetic circuit in which the magnet flux passed through the permanent magnet 37a passed from the teeth 34b through the yoke 35 via the adjacent permanent magnet 37b, wherein since the flowing direction of the magnet flux in the teeth differs from that in the yoke, it was necessary to use an armature core 33 not having any directivity. Therefore, there was a shortcoming due to which the magnetic permeability was lowered, and the peak thrust was decreased.

Figure 10:
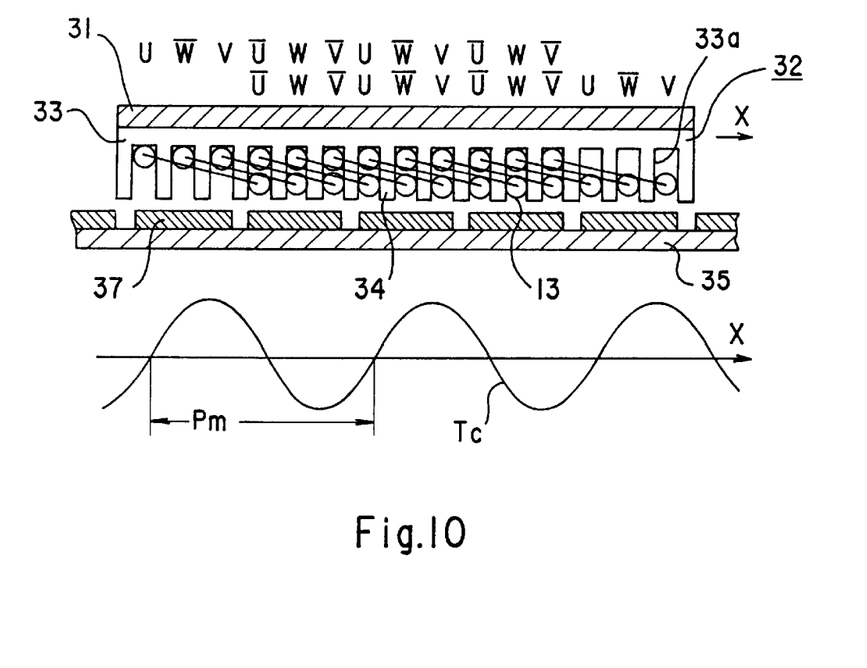
FIG. 10 is a view showing one example of winding patterns of a prior art linear motor.

(3) Also, FIG. 10 shows one example of winding patterns of a moving coil type linear motor. Where it is assumed that, in the armature core on which an armature coil is wound, the number of phases is n, the number of permanent magnets is p, and the number of teeth facing one polarity is q, the number N of teeth to be provided in the armature core is N=n×p×q, and in the armature core equidistantly provided with the number of teeth, three-phased windings U, V and W of the armature winding are wound so as to secure the teeth pitch equivalent to two or more pitches by skipping coils. However, the magnetic circuit of the moving armature cores is not made endless, but is opened at both ends. Therefore, an edge effect occurs, a cogging thrust Tc of one cycle is produced by a change in the magnetic resistance resulting from the core edge part in a magnetic polarity pitch of a field system magnet, whereby a problem of production unevenness in the thrust occurs when the armature and field system relatively move.

The present invention was developed to solve the abovementioned problems and shortcomings, and it is therefore an object of the invention to provide a linear motor which is capable of increasing the peak thrust and simultaneously counterbalancing a cogging thrust produced due to an edge affect of an armature, and in which the length of the linear motor in the axial direction can be adequately constructed.

SUMMARY OF THE INVENTION

In order to solve the abovementioned problems, a linear motor according to the first aspect of the invention having a field system yoke in which a plurality of permanent magnets having alternatively different polarities are placed adjacent to each other, and an armature having an armature winding wound on an armature core facing the permanent magnet row via a magnetized space, in which any one of the field system yoke and the armature is made into a stator, and the other is made into a rotor, and the field system yoke and the armature are caused to relatively run, wherein the armature core has a winding accommodation groove, and a convex and concave engagement part, which are formed on both sides of an armature iron plate by punching out electromagnetic steel plate so as to become roughly rectangular, the armature iron plate is laminated to constitute a core block, and the armature winds the armature winding in order in the winding accommodation groove of the respective core blocks, and at the same time, a plurality of engagement portions are engaged with each other.

A linear motor according to the second aspect of the invention is featured in that, in addition to the linear motor as set forth in the first aspect, the lengthwise direction orthogonal to the permanent magnet row in the respective core blocks is the same as the rolling direction of the electromagnetic steel plate.

A linear motor according to the third aspect of the invention is featured in that, in addition to the linear motor as set forth in the second aspect, the electromagnetic steel plate is made of an oriented electromagnetic steel plate.

A linear motor according to the fourth aspect of the invention is featured in that, in the linear motor as set forth in any one of the first through the third aspects, an armature core which accommodates the armature winding and has a plurality of core blocks engaged therein is made into a first core block group, a second core block being a dummy, which has a space provided therein and does not accommodate an armature winding, is provided at at least one end of both ends in the direction of the permanent magnet row of the first core block group, and the second core block has the same shape as that of the respective core blocks which constitute the first core block group.

A linear motor according to the fifth aspect of the invention is featured in that, in addition to any one of the first through the fourth aspects, the interval between the first core block group and the second core block is set to one-second of the pitch of the permanent magnet.

A linear motor according to the sixth aspect of the invention is featured in that, in addition to any one of the first through the fourth aspects, the second core block is provided at both sides of the first core block group, and at the same time, the interval between the first core block group and the second core block is set to two-thirds or one-third of the pitch of the permanent magnet.

DESCRIPTION OF THE PREFERRED EMBODIMENT

Hereinafter, a description is given of the invention with reference to the accompanying drawings:

Embodiment 1

Figure 1A:
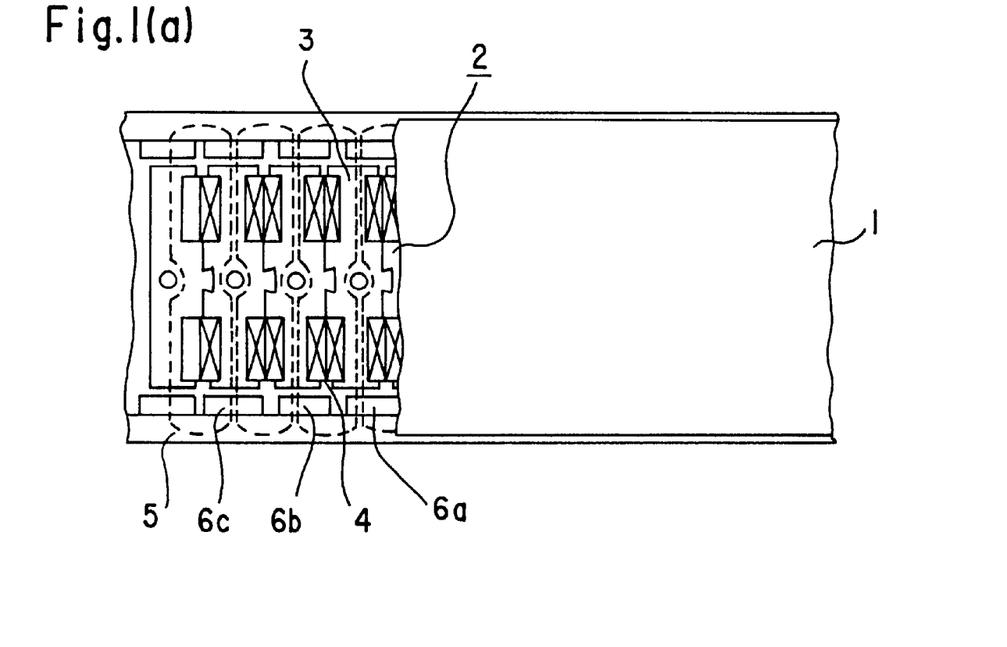
FIG. 1 shows a linear motor according to a first embodiment of the invention, wherein (a) is a partially exploded plan view showing the linear motor from above, and (b) is a front elevational view of an armature iron plate.

FIG. 1 shows the first embodiment of the invention, wherein (a) is a partially exploded plan view of a linear motor from above, and (b) is a front elevational view of an armature iron plate.

In the drawing, 1 is a rotor of the linear motor, and an armature 2 is fixed on the rear side of the rotor 1. The armature 2 accommodates an armature winding 4 wound in order in a winding accommodation groove 3a of an armature core 3. 5 is a field yoke which faces the armature 2 via a magnetized space and is fixed on a base (not illustrated). 6a, 6b, 6c, . . . are permanent magnets disposed at an equal pitch in the field yoke 5 so that they have alternately different polarities. In addition, the linear motor is an example of a magnetic flux penetration type in which a field yoke 5 is provided at both sides of the armature 2, and the basic structure is the same as in prior arts.

A description is given of points of the invention which differ from the prior arts.

Figure 1B:
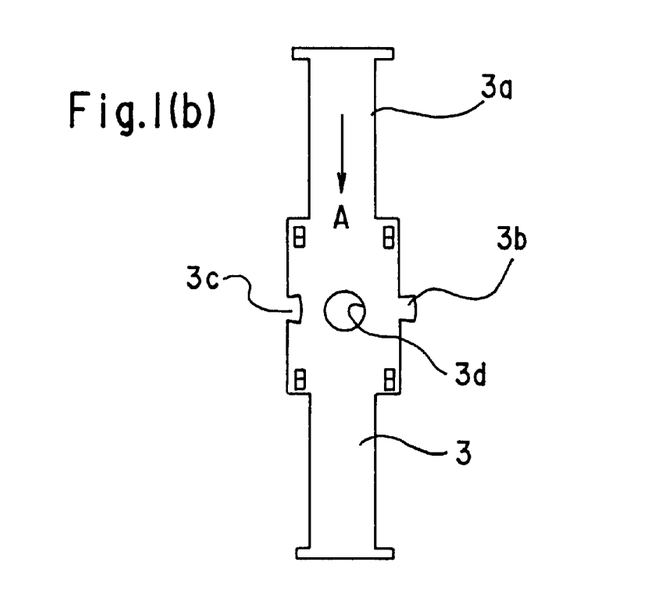

As shown in FIG. 1(b), the armature core 3 is constructed so that an armature iron plate is punched out from an oriented electromagnetic steel plate to be roughly rectangular, and the lengthwise direction of the roughly rectangular armature iron plate becomes the same direction as the rolling direction shown with the arrow A. A winding accommodation groove 3a is provided at both sides of the edge portion of the armature iron plate, wherein a convex engagement portion 3b is provided at one side face at the middle portion of the rectangle, and a concave engagement portion 3c is provided at the other side face. Further, an attaching hole 3d, which attaches the armature iron plate to the rotor 1 is provided at the middle of the armature iron plate. Such rectangularly punched out an armature iron plate are laminated to compose one core block, and at the same time, the armature is constructed by fitting the engagement portions 3b of the respective core blocks into the engagement portions 3c of the core block provided in juxtaposition.

The length of the armature of the linear motor thus constructed, in the lengthwise direction, can be adequately established by increasing or decreasing the number of the core blocks juxtaposed therein.

Next, a description is given of the actions of the linear motor.

As electric current is permitted to flow into the armature winding 4, a magnetic flux generated at the armature winding 4 flows along the rolling direction of the armature core 3 as shown by dotted lines in FIG. 1, and further flows from a permanent magnet 6b adjacent to the magnet 6a to the armature core 3 through the field yoke 5 via the permanent magnet 6a. The magnetic flux that flows into the armature core 3 flows from the opposed permanent magnet 6b into the armature core 3 via its adjacent permanent magnet 6a, passing through the armature core 3. By the electromagnetic action of the magnetic flux and that of the permanent magnet 6, the rotor 1 attached to the armature core 3 is caused to move in a linear direction.

[Embodiment 2]

Next, a description is given of the second embodiment of the invention.

Figure 2:
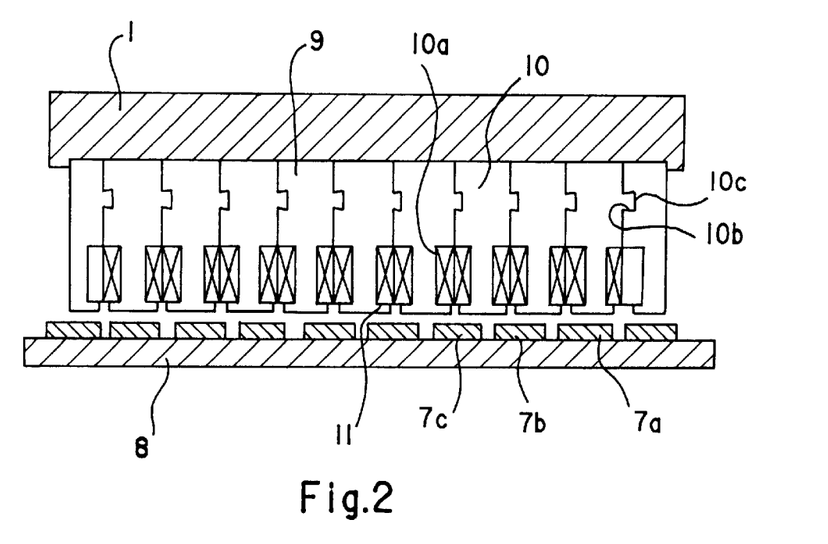
FIG. 2 is a side elevational view showing a linear motor according to a second embodiment of the invention.

FIG. 2 is a side elevational view of a linear motor showing the second preferred embodiment. Further, a linear motor according to the second embodiment is equivalent to a structure obtained by cutting the first embodiment in half at the axially symmetrical position of the magnetic flux penetrated type structure instead of the magnetic flux penetrated type structure shown with respect to the first embodiment, which shows a linear motor of a gap-opposed type structure of the same type as that in the prior parts.

In the drawings, 7a, 7b, 7c, . . . are permanent magnets which are disposed adjacent to the field yoke 8 fixed at the fixing portion (not illustrated) so that their polarities differ from each other. 9 is an armature which has a winding accommodation groove 10a at one side edge portion of an armature iron plate punched out to be rectangular, and provides an armature core 10 in which an armature iron plate having a convex engagement portion 10b at one side face of the middle portion, and a concave engagement portion 10c at the other side face is laminated, wherein an armature winding 11 is wound in order and accommodated in a winding accommodation groove 10a of the armature core 10, the engagement portion 10b of the armature core 10 is fitted in the engagement portion 10c of the armature core disposed in parallel, and is fixed on the underside of the rotor 1. With such a construction, as in the first embodiment, it is possible to adequately determine the length of the armature of the linear motor in its axial direction by increasing and decreasing the number of core blocks disposed in parallel. Also, the actions thereof are identical to those in the first embodiment, wherein description thereof is omitted.

Therefore, in the first and second embodiments, as regards the respective core blocks which constitute the armature core, the lengthwise direction of the armature iron plate obtained by punching out oriented electromagnetic steel plate to be roughly rectangular is determined to be the same direction as the rolling direction, and at the same time, the armature iron plate is laminated. Since the magnetic flux of the armature winding flows in the rolling direction of the armature core, the magnetic flux density can be increased, and resultantly, the peak thrust can be increased.

In addition, it is possible to adequately determine the length of the permanent magnet row of the linear motor in its lengthwise direction by increasing and decreasing the number of armature cores 10 juxtaposed to each other.

[Embodiment 3]

Next, a description is given of the third embodiment of the invention.

Figure 3:
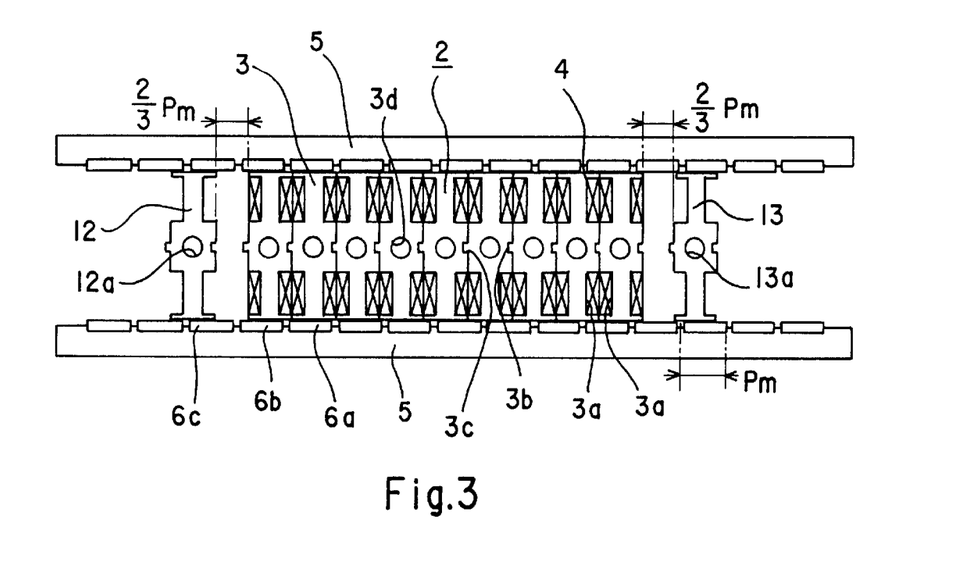
FIG. 3 is a plan view showing a third embodiment, which is observed from above.

FIG. 3 is a plan view showing the third embodiment when being observed from above. In addition, the drawing shows an example of a magnetic flux penetrated type linear motor in which eight field polarities are opposed to each other with respect to the armature consisting of nine core blocks.

The points at which the third embodiment is different from the first and second embodiments are as follows:

In the drawing, the armature core 3 which accommodates an armature winding and is composed of a plurality core blocks engaged therewith is made into the first core block group, wherein 12 and 13 are armature cores (hereinafter called the second core blocks) being dummies which have the same shape as that of the respective core blocks constituting the first core block and do not accommodate any armature winding. The second core blocks 12 and 13 are disposed, with a gap secured, at the edge portions at both ends of the first core block engaged with the permanent magnet rows 6a, 6b, 6c, . . . in the axial direction. That is, the second core blocks 12 and 13 are disposed with a gap equivalent to two-thirds of the piston Pm of permanent magnets secured between the first core block group and the second core blocks 12 and 13, wherein the first core block group is fixed at the rotor (not illustrated) via an attaching hole 3d while the second core blocks 12 and 13 are also fixed to the rotor via attaching holes 12a, and 13a.

Figure 4:
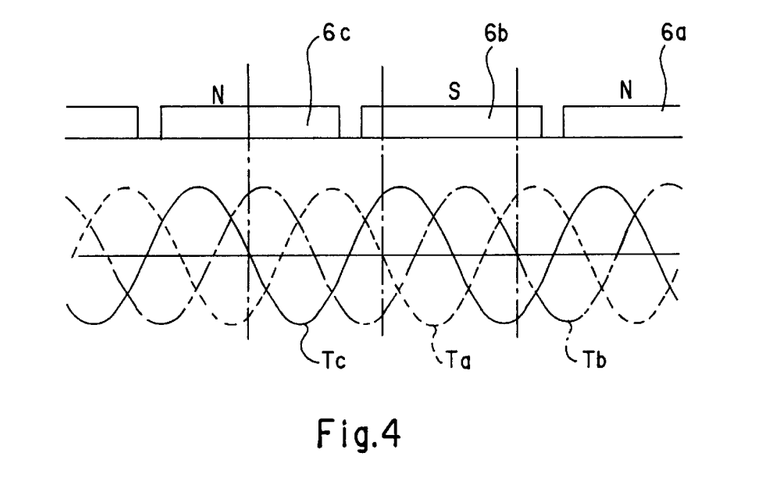
FIG. 4 is a conceptual view explaining the idea of counterbalancing a cogging thrust in the third embodiment.

FIG. 4 is a view explaining the concept of counterbalancing the cogging thrust in the embodiment. As shown in the drawing, the cogging thrust Tc produced by the edge effect of the armature 2 is produced at a ratio of one cycle per pitch (electric angle) of the magnet pitch Pm. Therefore, since there are a cogging thrust Tc produced at the armature portion and cogging thrusts Ta and Tb, produced at the second core blocks 12 and 13, which have a phase of two-thirds Pm, these three cogging thrusts Ta, Tb and Tc are added together as a whole, by which the cogging thrust produced by the edge effect of the armature 2 can be counterbalanced.

[Embodiment 4]

Next, a description is given of the fourth embodiment.

Figure 5:
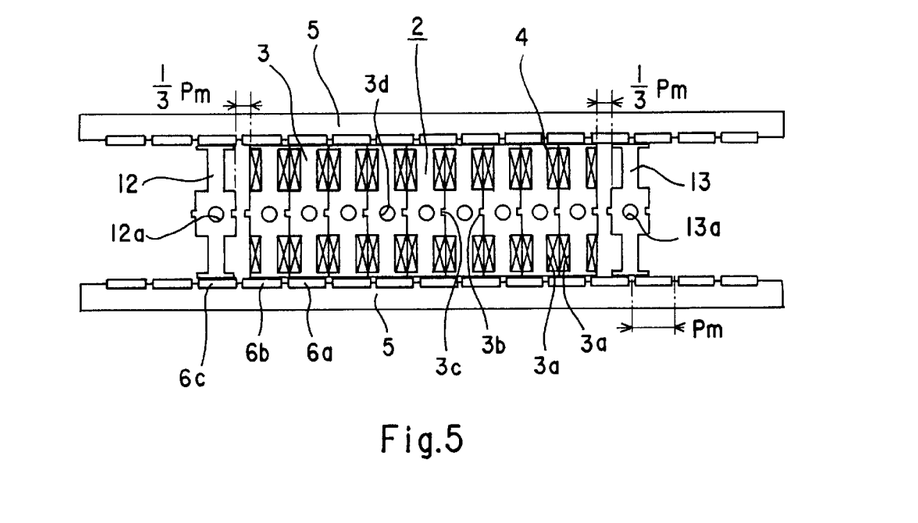
FIG. 5 is a plan view showing a fourth embodiment, which is observed from above.
Figure 6:
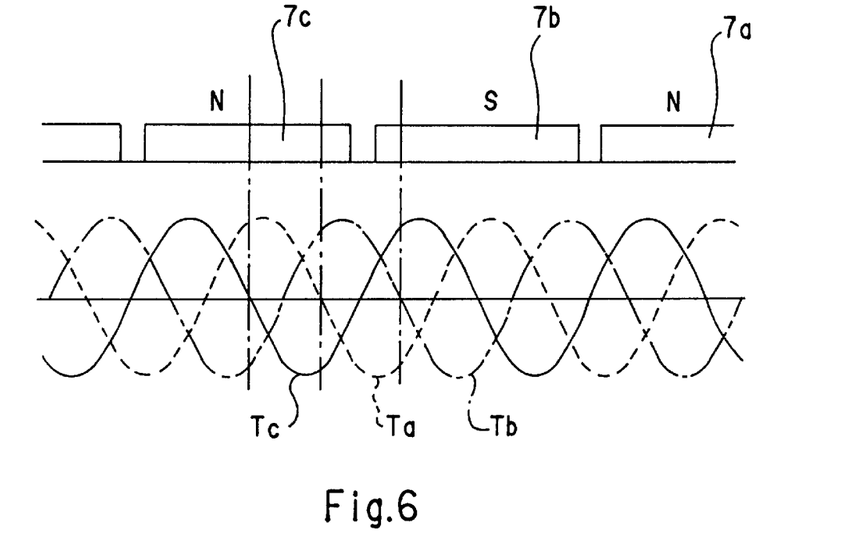
FIG. 6 is a conceptual view explaining the idea of counterbalancing a cogging thrust in the fourth embodiment.

FIG. 5 is a plan view of a linear motor according to the fourth embodiment, which is observed from above. FIG. 6 is a view explaining the concept of counterbalancing the cogging thrust by the fourth embodiment.

As in the third embodiment, the fourth embodiment is such that the second core blocks 12 and 13 are provided at both sides of the first core block group, and at the same time, the interval between the first core block group and the second core blocks 12, 13 is set to one-third of Pm which is the pitch of the permanent magnet, whereby since there are a cogging thrust Tc produced at the armature portion 2, and cogging thrusts Ta and Tb, produced at the second core blocks 12 and 13, which have a phase of one-third of Pm, the cogging thrusts Ta, Tb and Tc are resultantly added to each other. Thereby, the cogging thrust produced by the edge effect of the armature 2 can be counterbalanced. Also, as regards the actions, they are the same as those in the third embodiment, whereby description thereof is omitted.

[Embodiment 5]

Next, a description is given of the fifth embodiment of the invention.

Figure 7:
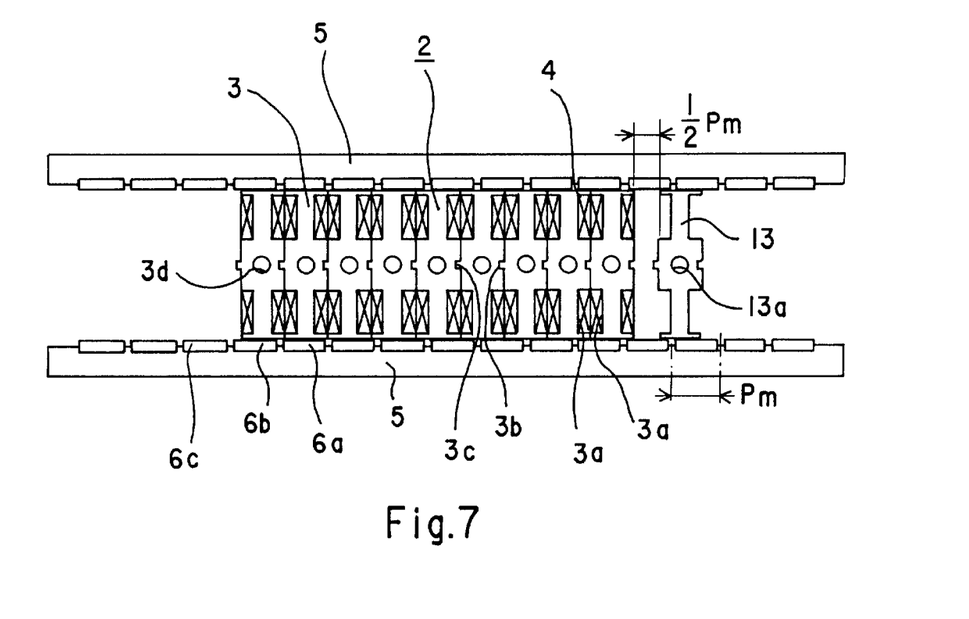
FIG. 7 is a plan view showing a fifth embodiment, which is observed from above.
Figure 8:
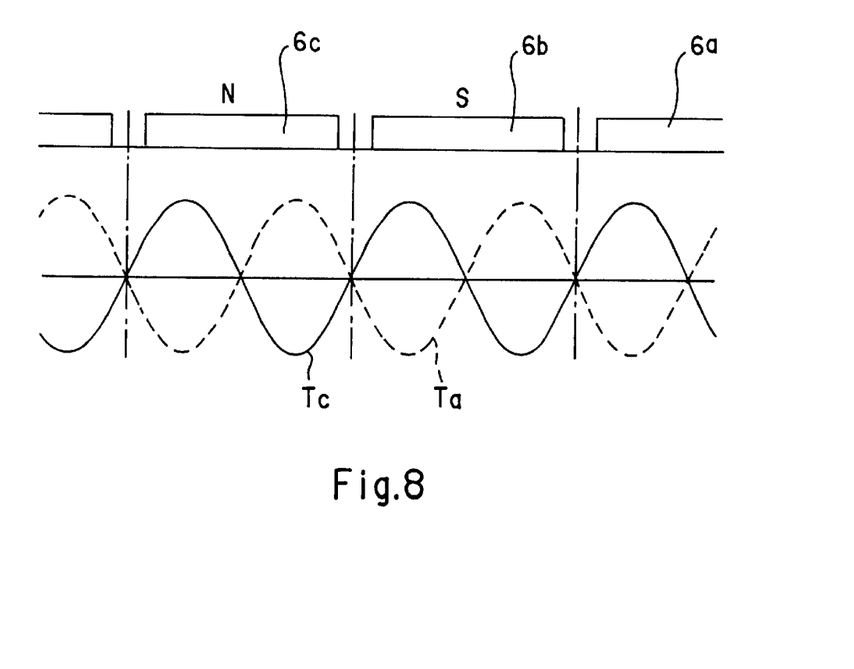
FIG. 8 is a conceptual view explaining the idea of counterbalancing a cogging thrust in the fifth embodiment.

FIG. 7 is a plan view of a linear motor according to the fifth embodiment, which is observed from above. FIG. 8 is a view explaining the concept of counterbalancing the cogging thrust according to the embodiment.

Differing from the third and fourth embodiments, in the fifth embodiment, the second core blocks are provided at one of both sides in the first core block group, and at the same time, the interval between the first core block group and the second core blocks is determined to one-second of Pm of the pitch of permanent magnets, whereby since there are a cogging thrust Tc produced at the armature portion 2, and cogging thrusts Ta and Tb, produced at the second core block 13, which have a phase of one-second of Pm, resultantly, the cogging thrusts Ta, Tb and Tc are added to each other, and the cogging thrusts produced by the edge effect of the armature 2 can be counterbalanced. In addition, since the actions thereof are similar to those in the third and fourth embodiments, description thereof is omitted.

Therefore, in the third through fifth embodiments, by means of the second core blocks becoming dummies, which do not have any armature winding, being disposed with a gap secured, at least one end of the first core block group engaged in the lengthwise direction of the permanent magnet row, the cogging thrust produced by the edge effect of the first core block group of the armature is added to the cogging thrust produced at the second core block. Therefore, it is possible to counterbalance the cogging thrust produced by the edge effect of the armature.

Also, the shape of the second core block used to counterbalance the cogging is identical to that of the respective first core blocks used for the armature portion. Since both the major parts and auxiliary parts can be commonly utilized, it is very advantageous in view of an increase in productivity and a decrease in production costs.

Also, in the first and second embodiments, although the armature is attached to the rotor, and the field yoke is attached to the fixing portion, the construction is not limited to the above. That is, the armature may be attached to the fixing portion, and the field yoke may be attached to the rotor. In addition, in the embodiments, although the electromagnetic steel plate is made of an oriented electromagnetic steel plate, it is not limited thereto. It may be made of a non-oriented electromagnetic steel plate.

Further, in the third through the fifth embodiments, a description is based on an example of a magnetic flux penetrated type linear motor. The linear motor is not limited thereto. It is needless to say that the embodiments may be applicable to a gap-opposed type linear motor.

Industrial Applicability

As described above, it is very effective when a linear motor according to the invention is utilized for table feeds in, for example, a machine tool, etc.

What claimed is:

1. A linear motor having a field yoke in which a plurality of permanent magnets having alternately different polarities are placed adjacent to each other, and an armature provided with an armature winding wound on an armature core facing said permanent magnet row via a magnetized space, in which any one of the field yoke and the armature is made into a stator, and the other is made into a rotor, and the field system yoke and the armature are caused to relatively run;

wherein said armature core has a winding accommodation groove, and a convex and concave engagement part, which are formed on both sides of an armature iron plate by punching out electromagnetic steel plate so as to become roughly rectangular, the armature iron plate is laminated to constitute a core block; and said armature accommodates the armature winding wound in order in the winding accommodation groove of said respective core blocks, and a plurality of engagement portions are engaged with each other.

2. A linear motor as set forth in claim 1, wherein the lengthwise direction orthogonal to said permanent magnet row in the respective core blocks is the same as a rolling direction of the electromagnetic steel plate.

3. A linear motor as set forth in claim 2, wherein said electromagnetic steel plate is an oriented electromagnetic steel plate.

4. A linear motor as set forth in any one of claims 1 through 3, wherein an armature core which accommodates a armature winding and has a plurality of core blocks engaged therein is made into a first core block group, a second core block being a dummy, which has a space provided therein and does not accommodate said armature winding, is provided at least one end of both ends in the direction of the permanent magnet row of said first core block group, and said second core block has the same shape as that of said respective core blocks which constitute said first core block group.

5. A linear motor as set forth in claims 1 through 3, wherein the interval between said first core block group and said second core block is set to one-third of the pitch of the permanent magnet.

6. A linear motor as set forth in any one of claims 1 through 3, wherein said second core block is provided at both sides of the first core block group, and at the same time, the interval between said first core block group and said second core block is set to two-thirds or one-third of the pitch of the permanent magnet.

* * * * *